(No Model.) 3 Sheets—Sheet 1.

A. & E. E. STARBUCK.
RAISING AND LOWERING DEVICE FOR HARVESTERS.

No. 437,461. Patented Sept. 30, 1890.

WITNESSES:
H. D. Nealy.
E. B. Griffith.

INVENTOR
Asa Starbuck,
Edwin E. Starbuck.
BY
C. P. Jacobs.
ATTORNEY.

(No Model.) 3 Sheets—Sheet 2.

A. & E. E. STARBUCK.
RAISING AND LOWERING DEVICE FOR HARVESTERS.

No. 437,461. Patented Sept. 30, 1890.

(No Model.) 3 Sheets—Sheet 3.
A. & E. E. STARBUCK.
RAISING AND LOWERING DEVICE FOR HARVESTERS.
No. 437,461. Patented Sept. 30, 1890.
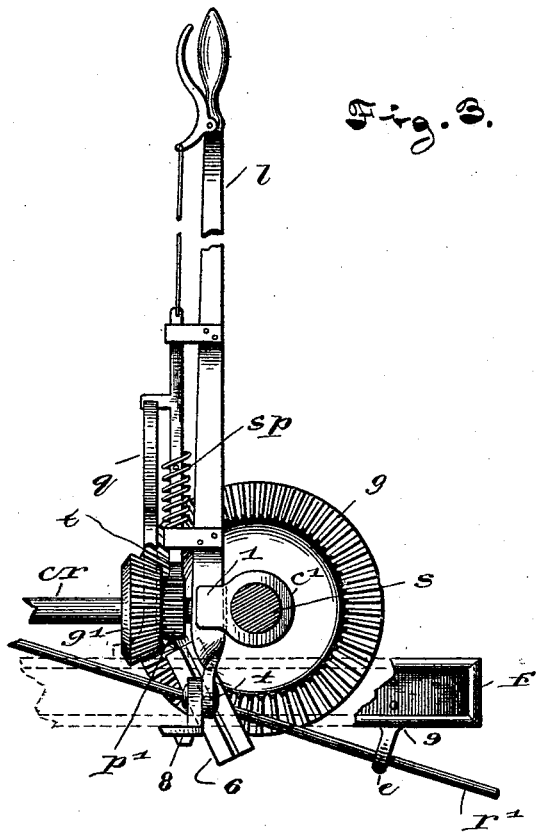
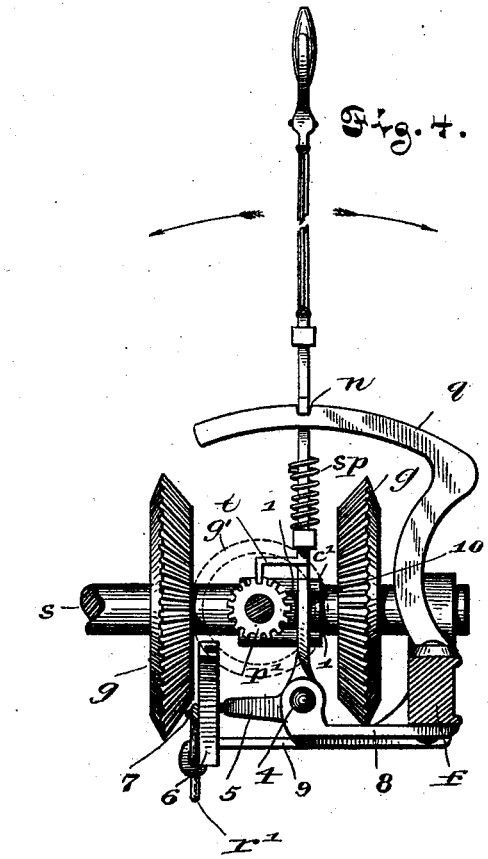

UNITED STATES PATENT OFFICE.

ASA STARBUCK AND EDWIN E. STARBUCK, OF BRIDGEPORT, INDIANA.

RAISING AND LOWERING DEVICE FOR HARVESTERS.

SPECIFICATION forming part of Letters Patent No. 437,461, dated September 30, 1890.

Application filed March 10, 1890. Serial No. 343,231. (No model.)

*To all whom it may concern:*

Be it known that we, ASA STARBUCK and EDWIN E. STARBUCK, of Bridgeport, county of Marion, and State of Indiana, have invented certain new and useful Improvements in Raising and Lowering Devices for Harvesters; and we do hereby declare that the following is a full, clear, and exact description thereof, reference being had to the accompanying drawings, in which like letters and figures refer to like parts.

Our invention relates to the construction of raising and lowering devices for harvesters, and it will be fully understood from the following specification and claims, reference being had to the accompanying drawings, in which—

Figure 1:
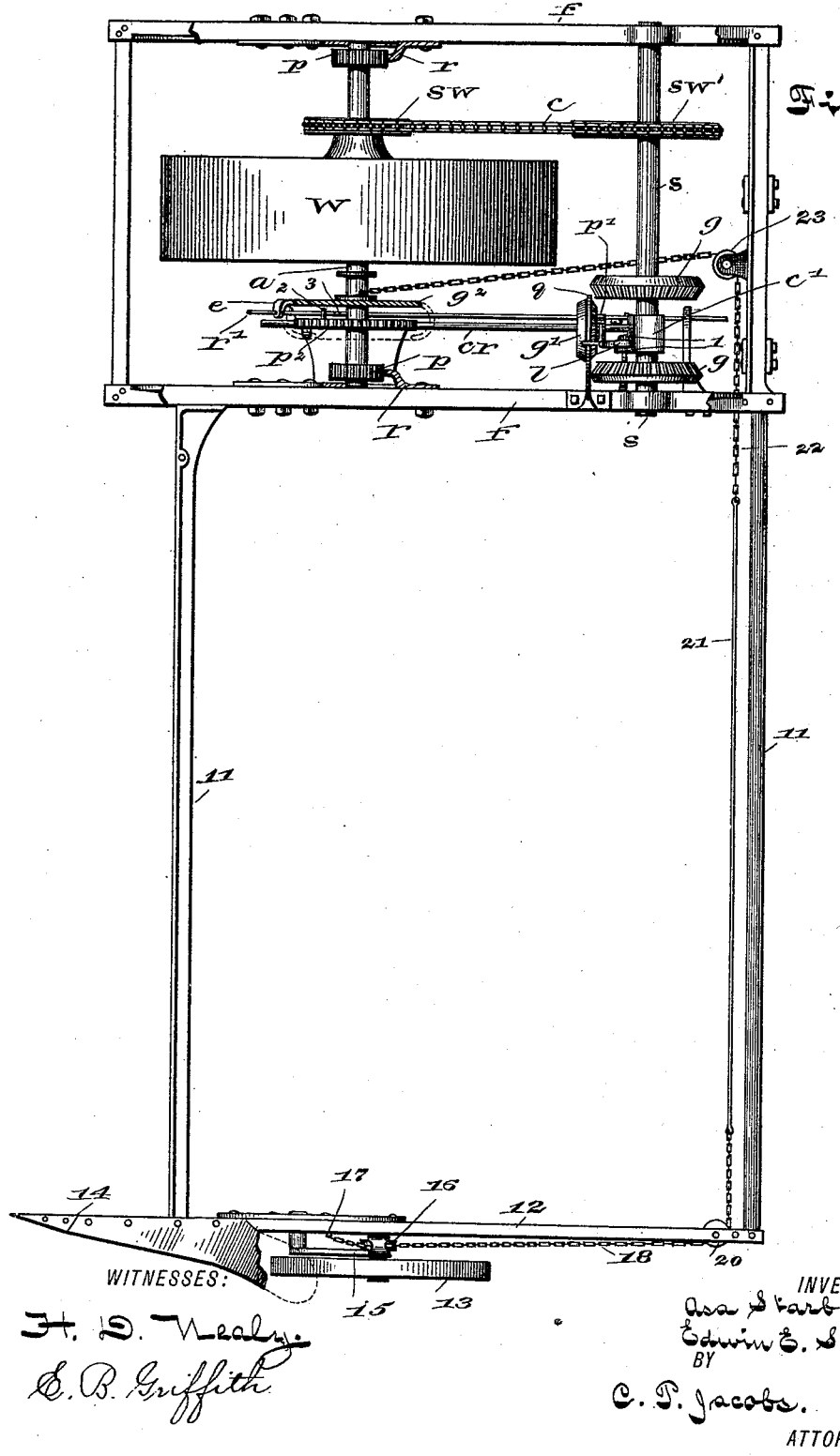
Figure 2:
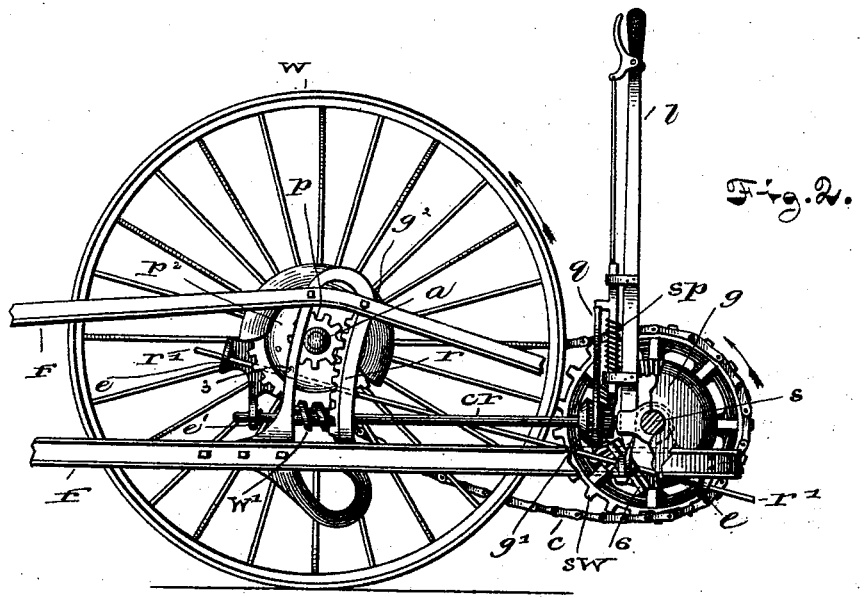

Figure 1 is a top plan view of the framework and main wheel of the harvester with our device attached. Fig. 2 is a side view of the main wheel and a portion of the framework with our device connected thereto, partly broken away. Fig. 3 is an enlarged detail side view of the shifting mechanism partly broken away. Fig. 4 is an inner end view of the same.

In detail, $a$ is an axle carrying loosely the main or central wheel $w$, upon which the weight of the harvester rests.
$p$ are pinions mounted on the same axle near its ends and engaging in the racks $r$, mounted on the frame $f$, the axle bearing against the opposite side of the rack-frame. $sw$ is a sprocket-wheel mounted upon the axle $a$ on one side of the main wheel $w$ and rotating with said wheel, and carries a chain $c$, which passes over and around the sprocket-wheel $sw'$, mounted upon the shaft $s$, which has loose bearings in the frame-work $f$ of the harvester, and carries on its inner end the beveled gear-wheels $g$ $g$. Between these beveled gears is loosely mounted a collar $c'$, having projections 11 on its side nearest the axle $a$. In this extension there is formed a slot 10, its sides curved, as shown in Fig. 4, to permit easy movement. The hand-lever which works in it is pivoted at 4 to a bracket 8, attached to the frame-work. This lever has an extension or finger 5 at its lower end to work loosely in the grooved piece 6, rigidly attached at 7 to the rod $r'$, which will be explained farther on. The lever $l$ also has a locking device, which consists of an ordinary latch, which engages with a notch in the quadrant-bar $q$, which is attached to the frame-work $f$. The lower end of the locking-bolt is rigidly secured to or formed integral with an angle-arm $t$, which extends out far enough to be in a line vertical with the center of the pinion $p'$, with which it engages. This pinion is mounted on the connecting-rod $cr$ near its end and close to the beveled gear $g'$, and serves to lock the worm-shaft against rotation when the lock-bolt $t$ drops into its teeth. The rod $cr$ is loosely seated in a socket formed in the enlarged portion of the collar $c'$, and it extends across to and has bearings at that end in the ear $e'$ formed on the guard $g^2$, which partly covers the gear-wheel or pinion $p^2$, mounted on the axle $a$ at one side of the main wheel of the harvester. This pinion meshes with a worm-screw on the rod $cr$, and is adapted to be rotated by it, and has on its inner side a pin 2, adapted to engage with the lug 3 on the rod $r'$, which has loose bearings in the eye $e$ of the guard $g^2$ and in a similar eye $e$ on the bracket 9 of the main frame $f$, and has rigidly attached to it at 7 the grooved piece 6, this being preferably attached at an angle of about forty-five degrees.

The operation of our device is as follows: It being desired to raise the machine while moving, the lever $l$ is grasped, releasing the lock-bolt from the notched quadrant $q$ and pinion $p'$. It is then thrown to the left, bringing the beveled gear $g'$ in contact with one of the beveled gears $g$, which is rotated by means of the sprocket-wheels $sw$ $sw'$ and chain $c$. The rod $cr$ is rotated, and its worm $w$, engaging with the pinion-wheel $p^2$, operates it and the smaller pinions $p$, which engage with the racks, and the machine is lifted up or lowered. When the pinions $p$ have traveled nearly to the top of the racks, the pin 2 on the inner side of the pinion $p^2$ engages with the lug 3 on the rod $r'$, forcing it along by means of the grooved piece 6, throwing the lever $l$ to the right and locking it by the locking-bolts in the notch $n$ and pinion $p'$ both at the same operation. The rod $r'$ remains in this position until the machine is raised, when, the pinion $p^2$ revolving in the opposite direction, the pin 2 engages with the lug 3 and brings the rod back to its former position and ready for a similar operation. This engagement of the pin 2 with the lug 3 prevents the frame from being lowered too far, and thus danger of breakage at either extreme of movement of the frame is avoided.

In Fig. 4 the beveled gear $g'$ is shown in the dotted lines, and its diameter is a little enlarged for the purpose of clearness of illustration. When disengaged, as shown in Fig. 4, the lever $l$ is locked in the notch $n$ of the quadrant-bar, and the arrows indicate the movement of the lever, respectively, to the left and right for raising or lowering the machine.

So far we have only described the mechanism for raising one side of the machine. The grain-wheel side is elevated by the following mechanism: Extending out from the frame surrounding the main wheel of the harvester are two arms $l\ l$, whose outer ends are connected by the cross-bar 12, which carries the grain-wheel 13 and the wheel-guard 14. This grain-wheel is mounted on a stub-axle, connected to an angle-arm 15 and at its angle. The lower end of this angle-arm is pivoted to the cross-bar 12, and on its upper end is a pulley or sheave-wheel 16. To the cross-bar 12 at 17 is attached a chain 18, which passes up over the pulley 16 and back over another sheave-pulley 20, and is connected by a rod 21 to another chain 22, which passes around a pulley 23, attached to the under side of the frame $f$, and thence to the axle $a$ between the main wheel $w$ and guard $g^2$. Thus it will be seen that when the raising mechanism is put in operation and the axle $a$ rotated the chain will be rolled around it and lift the outer or grain-wheel end of the machine.

It is obvious that changes may be made in our device without destroying the principle of our invention and that it may be used on other machines than harvesters.

What we claim as our invention, and desire to secure by Letters Patent, is the following:

1. In a raising and lowering device for harvesters, a counter-shaft journaled loosely in bearings in the frame-work which carries the main wheel, mechanism for revolving such counter-shaft from the main shaft, a pair of beveled gear-wheels mounted near one end of such counter-shaft, a collar movable on such shaft between such gear-wheels, a connecting-rod whose rear end has bearings in a socket formed in such collar, a beveled gear mounted on such connecting-rod between the beveled gear-wheels carried on the counter-shaft and adapted to be thrown into or out of engagement with such gear-wheels alternately, a lever mechanism for actuating the same, a worm formed near the inner end of the connecting-rod engaging with a pinion mounted on the main axle, smaller pinions, also mounted on such main axle near its outer end, and a rack-bar fastened to the frame-work whose teeth normally engage with the teeth of such smaller pinions, whereby the movement of the lever is adapted to raise or lower the machine, all combined substantially as shown and described.

2. A raising and lowering device for harvesters, comprising a frame-work, a main axle journaled thereon and carrying pinions near its end, rack-frames fastened to such frame-work in such position that their teeth engage with those of the pinions on the main axle, a main wheel centrally and loosely mounted on such axle, a counter-shaft loosely journaled on the frame-work behind such main wheel, beveled gears mounted near one end thereof, and a connecting-rod, one end thereof carried in a sliding collar mounted on such counter-shaft and carrying a pinion adapted to engage with the teeth on the beveled gear-wheels, such sliding collar operated by a hand-lever pivotally connected to the frame, such lever carrying a latch which engages with a pinion mounted on such connecting-rod, the opposite end of the connecting-rod loosely carried in a bracket connected to the main axle and provided with a worm adapted to engage with the teeth of the pinion also carried upon such axle, whereby the pinion on the connecting-rod may be thrown in or out of gear with the beveled gear mounted on the counter-shaft, all combined substantially as shown and described.

3. In a raising and lowering device for harvesters, a frame-work, a counter-shaft revoluble in bearings thereon carrying a pair of beveled gears near one end, a sliding collar loosely mounted on such counter-shaft between such beveled gears, a lever pivotally connected to the frame and adapted to engage with such sliding collar, a connecting-rod, one end supported in such collar and the other in a bracket on the frame, and carrying a pinion which engages with a latch carried by the lever, a bevel-pinion on the connecting-rod, the connecting-rod also carrying a worm, which, engaging with the pinion on the main shaft, operates the raising and lowering mechanism, and a shifting rod, one end thereof carried in a bracket connected to the main axle and the other in a bracket connected to the frame and provided with a block set at an angle having a groove, which is adapted to engage with the lever mechanism for automatically throwing the machine out of gear and preventing breakage when the lifting device has reached its limit, all combined substantially as shown and described.

In witness whereof we have hereunto set our hands this 8th day of February, 1890.

ASA STARBUCK.
EDWIN E. STARBUCK.

Witnesses:
C. P. JACOBS,
JAMES B. MULKY.